Dec. 24, 1963   J. H. LEEMING, JR., ETAL   3,115,635
PORTABLE DIRECTION FINDER
Filed Dec. 18, 1961
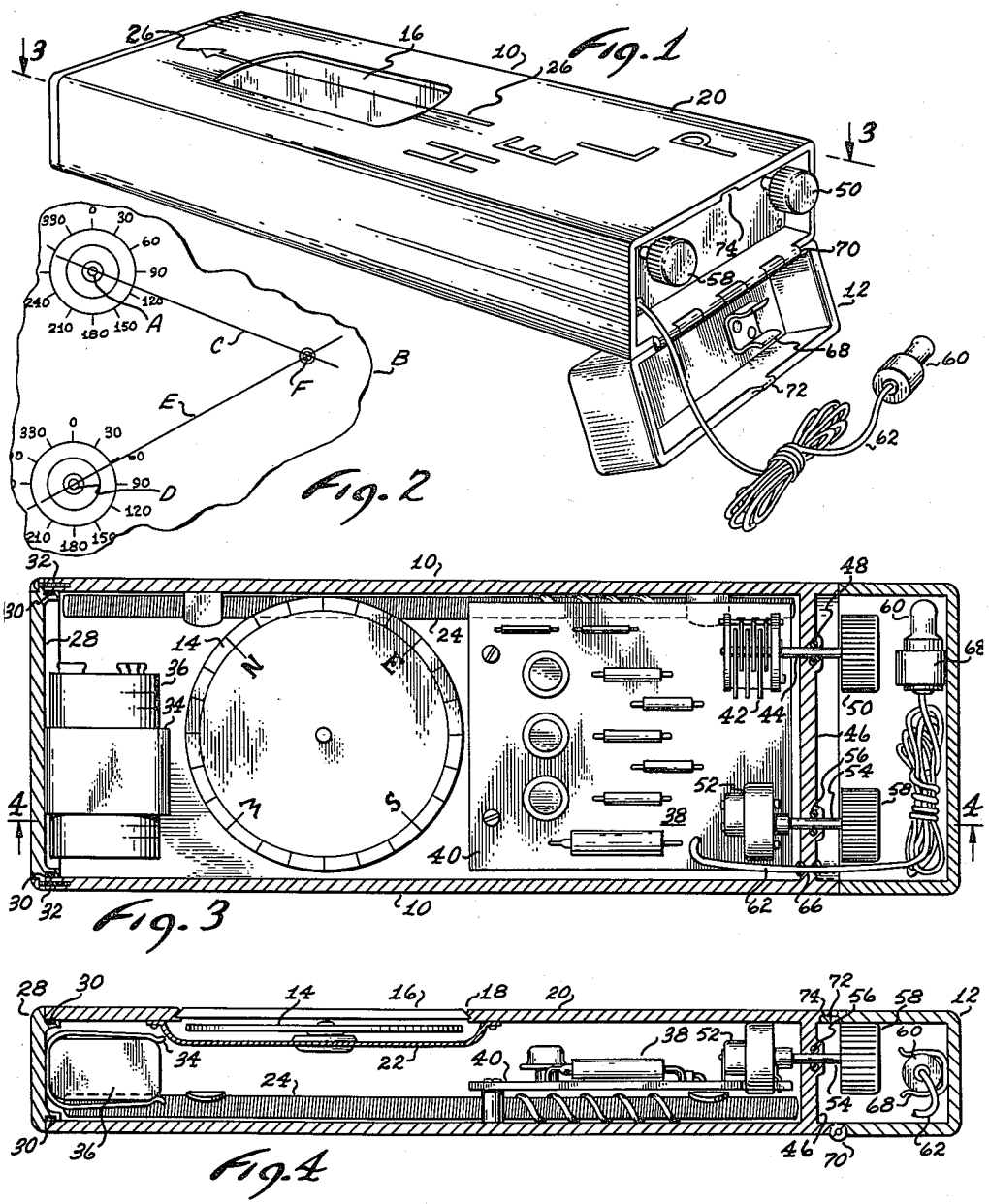
INVENTORS.
JOHN H. LEEMING JR.
CHESTER M. KENRICH
-AND- ROBERT C. RICE JR.
BY
Wm. H. Dean
AGENT

United States Patent Office 3,115,635
Patented Dec. 24, 1963

3,115,635
PORTABLE DIRECTION FINDER
John H. Leeming, Jr., 5535 W. Monterosa; Chester M. Kenrich, 907 W. Augusta; and Robert C. Rice, Jr., 3202 W. Citrus Way, all of Phoenix, Ariz.
Filed Dec. 18, 1961, Ser. No. 160,100
10 Claims. (Cl. 343—113)

This invention relates to a portable direction finder and more particularly to a small, compact, portable direction finder which may be used by outdoorsmen, including hunters, helmsmen, prospectors, pilots of aircraft, or others who need to establish their position relative to radio stations.

Heretofore, direction finders have been expensive, bulky and have not been readily adapted to environmental conditions such as those to which an outdoorsman would ordinarily subject such an instrument. Furthermore, it has been a problem to provide a small, compact radio direction finder which is rugged, waterproof and which may be readily and easily carried by an individual without inconvenience. Additionally, it has been a problem to provide a rugged, compact, lightweight direction finder which will withstand outdoor environmental conditions and which is provided with an earphone and controls readily accessible to the operator and which are also completely protected from mechanical damage when the instrument is being transported or carried about.

Accordingly, it is an object of the present invention to provide a very small, compact, lightweight, self-contained direction finder which is readily and easily carried on the person of an outdoorsman, small boat operator, aircraft pilot, prospector or other person without inconvenience.

Another object of the invention is to provide a direction finder which comprises a self-contained directional antenna, power source, amplifier, controls and compass, all disposed within a very small enclosure capable of being carried in a person's pocket.

Another object of the invention is to provide a direction finder which is very simple and easy to operate and which may be readily usable by the layman.

Another object of the invention is to provide a direction finder which is usable in conjunction with conventional maps having locations of radio stations thereon surrounded by compass rose designation, whereby the direction finder of the present invention may readily be used to tune such stations and to indicate their angular direction on the map so that lines passing through the compass roses surrounding the radio stations in directions corresponding to those shown by the compass of the instrument, may intersect on the map and thereby indicate the location of the operator of the instrument.

Another object of the invention is to provide a direction finder having a normal housing and control compartment structure, where in one section of the housing are contained a directional antenna, power source, compass and controls for the amplifier, all of which are sealed therein for protection from the elements while an openable compartment of the housing structure encloses controls for the electronics equipment of the direction finder and which contains an earphone so that the entire equipment of the direction finder is protected from the elements as well as mechanical hazards.

Another object of the invention is to provide a direction finder having a pair of compartments, one of which is substantially sealed and the other of which is openable. The one compartment containing a directional antenna, a power source, an amplifier and a compass, while the other compartment contains controls and earphone equipment; said controls and earphone equipment having means projecting from the sealed compartment into the openable compartment, so that access to the controls and earphone equipment may readily be had by opening the openable compartment and whereby these controls and earphone equipment structures may readily be enclosed by closing the openable compartment to thereby prevent damage to such equipment during normal handling and transporting operations.

Further objects and advantages of the invention may be apparent from the following specification, appended claims and accompanying drawings, in which:

FIG. 1 is a perspective view of a direction finder, in accordance with the present invention, and showing an openable compartment of the direction finder housing in open position to provide access to controls and earphone equipment;

FIG. 2 is a view of a fragmentary portion of a map illustrating conventional compass rose designations disposed about radio station locations on the map and further illustrating intersecting lines drawn through the compass roses around the stations and indicating a location of an operator of a direction finder at the intersections of such lines remote from said stations;

FIG. 3 is a plan sectional view taken from the line 3—3 of FIG. 1, showing equipment internally of the housing of the direction finder of the invention; and FIG. 4 is a sectional view taken from the line 4—4 of FIG. 3.

As shown in FIG. 1 of the drawings, the direction finder of the invention is provided with housing sections 10 and 12. The housing section 10 is substantially enclosed and sealed to protect electronics equipment from the elements while the compartment 12 is openable to expose controls and earphone equipment of the invention as will be hereinafter described in detail.

Referring to FIGS. 3 and 4 of the drawings, it will be seen that the housing 10 encloses a compass 14 which may be viewed through a window 16 in the normally upper side of the housing 10. The window 16 is sealed at its peripheral edge portions 18, as shown in FIG. 4 of the drawings and the compass 14 is retained in connection with the normally upper side wall 20 of the housing 10 by a casing 22. This casing 22 supports the compass 14 and also shields it from a ferrite rod-type directional antenna 24. This antenna 24 has its longitudinal axis disposed substantially parallel with the longitudinal axis of the elongated housing portion 10 and parallel with this ferrite rod antenna 24 is an arrow 26 disposed on the top of the casing wall 20. This arrow 26 may be imprinted on the upper surface of the housing or may be recessed therein, as desired. This arrow continues across the surface of the window 16 and thus provides a sighting facility for the pointing of the instrument toward a radio station, as will be hereinafter described.

The housing 10 is provided with a removable end wall 28 which is provided with a seal 30, in order to efficiently seal the end wall 28 in its removable relation with the remainder of the housing 10. This wall is removably retained by screws 32 and carries a battery holding clip 34 which supports a battery 36, all as shown best in FIGS. 3 and 4 of the drawings. This battery 36 serves as a power source for a transitorized electronic amplifier 38 mounted on a card 40 in the housing compartment 10.

The amplifier 38 comprises a tuning condenser 42 having a shaft 44 extending through a wall 46 of the compartment 10. An O-ring 48 provides a seal around the shaft 44 and connected to the outwardly extending end of the shaft 44 is a control knob 50, used for manual adjustment of the condenser 42.

A sensitivity control 52 forms part of the amplifier 38 and this control is provided with a shaft 54 extending through the wall 46 and sealed by an O-ring 56 therein. A knob 58 is connected to the outwardly extending end of the shaft 54 to provide for manual adjustment of the sensitivity control 52.

An earphone 60 is coupled by a cord 62 with the amplifier 38 and this cord 62 extends through an opening 66 in the wall 46 and is suitably sealed to prevent moisture or other foreign matter from entering the housing compartment 10 around the cord 62.

A clip 68 is fixed to openable compartment 12, at the inside thereof, and normally holds the earphone 60 when stowed in the housing compartment section 12.

The housing compartment 12 is a box-shaped structure pivotally connected to the housing compartment 10 by means of the hinge 70. A latch tab 72, integral with the compartment 12, serves as a detent in engagement with a suitable mating portion 74 on the housing compartment 10 to hold the compartment 12 closed, as shown in FIG. 4 of the drawings.

It will be appreciated by those skilled in the art that all of the critical electronic components, as well as the battery 36 and the compass 14, are sealed in the housing compartment 10 to prevent the entrance of moisture or other foreign matter into the compartment 10 so that the direction finder of the invention may be immersed in water without harm thereto. The cord 62, being sealed at 66, and the shafts 44 and 54, being sealed by the O-rings 48 and 56, respectively, provides for a complete sealed enclosure of the compartment 10.

The control knobs 50 and 58, being outwardly of the housing wall 46, and within the openable compartment 12, provides easy access to the controls and the earphone 60. These portions of the direction finder are completely protected against mechanical damage and such hazards by the compartment 12 when in a closed position, as shown in FIG. 4 of the drawings. Thus, the direction finder of the invention may be placed in a person's pocket and carried about without any hazard thereto.

The condenser 42 provides for a tuning between 200 kcs. and 400 kcs. while a null of less than 2 degrees width will exist when the instrument is tuned on a 150-watt range station approximately 150 miles distant. The sensitivity control 54 provides a control for the output volume from a maximum to 20 percent by means of sensitivity control on the first RF stage of the amplifier 38. The audio signal from the RF carrier is demodulated and this signal consists of a 400 cycle tone or code which is received by the operator through the earphone 60.

The battery 36 may be capable of providing approximately 100 hours of intermittent operation. This, of course, depends upon the size and the character of the battery.

Utilizing transitorized circuitry, the unit may be quite small; for example, 1⅜ inches by 2½ inches by 9 inches. Thus the unit may readily fit into a person's pocket, may be carried in a packsack, or aboard a small aircraft or boat without inconvenience.

It will be understood that the compass 14 is quite close to the window 16, in order to minimize inaccuracy of reading due to parallax.

In operation, a lost person, such as a hunter or prospector, may find his location as follows:

Operation of the direction finder of the invention is initiated by first rotating the control knob 58 and thereby closing a switch to couple the battery 36 with the amplifier 38 and thereby energize it. Further rotation of the knob 58 provides for sensitivity control, as will be hereinafter described.

When the amplifier 38 is thus energized, the knob 50 may be rotated to adjust the variable condenser 42 to a given calibrated position corresponding with the frequency of a known radio station, as for example, a station A, shown on a portion of a map B, as illustrated in FIG. 2 of the drawings. When the direction finder is thus tuned to the proper frequency, the housing 10 is held in a horizontal position with the side 20 uppermost and as the instrument is moved about a vertical axis, the arrow is eventually directed toward the station which has been tuned by the variable condenser 42. The operator receives a signal through the earphone 60 and the operator then notes the direction of the arrow 16 when a minimum signal strength, emanating from the station, occurs. It will be obvious to those skilled in the art that when the ferrite rod antenna 24 is axially directed toward the station, that a minimum or null signal condition will occur. Thus, the operator will note that the arrow 16 is pointed directly toward the station and he may then read the angular direction thereof with respect to the rose of the compass 14.

Having noted this direction, he may use the side of the housing 10 as a straight-edge to apply a line C to the map. This line C will be drawn through the compass rose surrounding the station A at an angle corresponding to that previously read on the compass 14.

After the line C has been drawn on the map, the operator then tunes the condenser 42 to a frequency corresponding with another station designated D on the map. The previous procedure is followed in order to find a null signal emanating from the station D, whereupon the arrow 26 is pointed toward the station D, the operator then again notes the direction by viewing the compass 14 through the window 16. A line is then drawn along one side of the housing 10, using it as a straight-edge, this line being drawn through the compass rose surrounding the station D at an angle corresponding to that read on the compass 14. This line drawn through the compass rose, surrounding the station D, is designated E, in FIG. 2 of the drawings. The line E will then intersect the previously drawn line C and the point F, at which the lines C and E inersect, will be the actual location of the operator of the direction finder of the present invention. Thus, the lost hunter or prospector, operating the direction finder of the invention, will have spotted his location on the map and then he may use the compass 14 to navigate to a road or other landmark shown on the map so that he may make his way back to civilization.

It will be understood that the housing portions 10 and 12 are preferably made of waterproof material which is non-magnetic and which does not interrupt or impede the normal radio waves. The waterproof character of the material, which may be plastic or any other suitable non-magnetic material, protects all of the vital elements of the direction finder from various environmental conditions and the sealed condition of the housing compartment 10 prevents all types of foreign matter from entering the electronics compartment of the radio direction finder.

The openable housing portion 12 mechanically protects the controls and the earphone equipment of the invention and provides easy access to these pieces of equipment so that the direction finder may readily and easily be operated.

It will be obvious to those skilled in the art that various modifications of the present invention may be resorted to in a manner limited only by a just interpretation of the following claims.

We claim:

1. In a direction finder the combination of: a housing having an enclosed compartment and an openable compartment; a directional antenna in said enclosed compartment, an amplifier coupled thereto; a power supply means in said enclosed compartment; a compass in said enclosed compartment; a window normally above said compass and forming a normally upper side wall for said enclosed compartment; control means of said amplifier extending through one wall of said enclosed compartment into said openable compartment; audio means in said openable compartment and coupled to said amplifier in said enclosed compartment, said last mentioned means having a flexible conductor extending in sealed relationship through said wall between said enclosed compartment and said openable compartment.

2. In a direction finder the combination of: a housing having an enclosed compartment and an openable compartment; a directional antenna in said enclosed compartment; an amplifier coupled thereto; a power supply means in said enclosed compartment; a compass in said enclosed compartment; a window normally above said compass and forming a normally upper side wall for said enclosed compartment; control means of said amplifier extending through one wall of said enclosed compartment into said openable compartment; audio means in said openable compartment and coupled to said amplifier in said enclosed compartment, said last mentioned means having a flexible conductor extending in sealed relationship through said wall between said enclosed compartment and said openable compartment; said control means comprising a variable condenser and a sensitivity control, each having a rotatable shaft extending through said wall between said enclosed compartment and said openable compartment and control knobs on said shafts disposed in said openable compartment.

3. In a direction finder the combination of: a housing having an enclosed compartment and an openable compartment; a directional antenna in said enclosed compartment, an amplifier coupled thereto; a power supply means in said enclosed compartment; a compass in said enclosed compartment; a window normally above said compass and forming a normally upper side wall for said enclosed compartment; control means of said amplifier extending through one wall of said enclosed compartment into said openable compartment; audio means in said openable compartment and coupled to said amplifier in said enclosed compartment, said last mentioned means having a flexible conductor extending in sealed relationship through said wall between said enclosed compartment and said openable compartment; said control means comprising a variable condenser and a sensitivity control, each having a rotatable shaft extending through said wall between said enclosed compartment and said openable compartment and control knobs on said shafts disposed in said openable compartment; seals in said walls surrounding said shafts.

4. In a direction finder the combination of: a housing having an enclosed compartment and an openable compartment; a directional antenna in said enclosed compartment, an amplifier coupled thereto; a power supply means in said enclosed compartment; a compass in said enclosed compartment; a window normally above said compass and forming a normally upper side wall for said enclosed compartment; control means of said amplifier extending through one wall of said enclosed compartment into said openable compartment; audio means in said openable compartment and coupled to said amplifier in said enclosed compartment, said last mentioned means having a flexible conductor extending in sealed relationship through said wall between said enclosed compartment and said openable compartment; said control means comprising a variable condenser and a sensitivity control, each having a rotatable shaft extending through said wall between said enclosed compartment and said openable compartment and control knobs on said shafts disposed in said openable compartment; seals in said walls surrounding said shafts; means removably supporting said audio means in said openable compartment.

5. In a direction finder the combination of: a housing having an enclosed compartment and an openable compartment; a directional antenna in said enclosed compartment, an amplifier coupled thereto; a power supply means in said enclosed compartment; a compass in said enclosed compartment; a window normally above said compass and forming a normally upper side wall for said enclosed compartment; control means of said amplifier extending through one wall of said enclosed compartment into said openable compartment; audio means in said openable compartment and coupled to said amplifier in said enclosed compartment, said last mentioned means having a flexible conductor extending in sealed relationship through said wall between said enclosed compartment and said openable compartment; said control means comprising a variable condenser and a sensitivity control, each having a rotatable shaft extending through said wall between said enclosed compartment and said openable compartment and control knobs on said shafts disposed in said openable compartment; seals in said walls surrounding said shafts; means removably supporting said audio means in said openable compartment; said openable compartment hinged to said enclosed compartment.

6. In a direction finder the combination of: a housing having an enclosed compartment and an openable compartment; a transistorized electronic amplifier in said enclosed compartment; a directional antenna coupled thereto and also enclosed in said enclosed compartment; a battery coupled to said electronic amplifier and disposed in said enclosed compartment; a compass disposed in said enclosed compartment; a window in a normally upper side of said enclosed compartment disposed above said compass; a housing shield below said compass disposed to shield it from magnetic effects existing in said enclosed compartment; a condenser and a sensitivity control of said electronic amplifier, each having a shaft extending through a wall of said enclosed compartment; means sealing said shafts in said wall for rotary motion therein; said shafts extending into said openable compartment and each provided with a control knob; an earphone in said openable compartment; a flexible conductor means coupled to said earphone and extending through said wall of said enclosed compartment and connected to said electronic amplifier; said openable compartment hinged to said enclosed compartment and disposed to cover said control knobs and retain said earphone therein when the direction finder of the invention is not in use.

7. In a direction finder the combination of: a housing having an enclosed compartment and an openable compartment; a transistorized electronic amplifier in said enclosed compartment; a directional antenna coupled thereto and also enclosed in said enclosed compartment; a battery coupled to said electronic amplifier and disposed in said enclosed compartment; a compass disposed in said enclosed compartment; a window in a normally upper side of said enclosed compartment disposed above said compass; a housing shield below said compass disposed to shield it from magnetic effects existing in said enclosed compartment; a condenser and a sensitivity control of said electronic amplifier, each having a shaft extending through a wall of said enclosed compartment; means sealing said shafts in said wall for rotary motion therein; said shafts extending into said openable compartment and each provided with a control knob; an earphone in said openable compartment; a flexible conductor means coupled to said earphone and extending through said wall of said enclosed compartment and connected to said electronic amplifier; said openable compartment hinged to said enclosed compartment and disposed to cover said control knobs and retain said earphone therein when the direction finder of the invention is not in use; said directional antenna being a ferrite rod; and pointer means on the upper surface of said enclosed compartment above said compass; said pointer means pointing in a direction parallel to the longitudinal axis of said ferrite rod directional antenna.

8. In a direction finder the combination of: a housing having an enclosed compartment and an openable compartment; a directional antenna in said enclosed compartment, an amplifier coupled thereto; a power supply means in said enclosed compartment; a compass in said enclosed compartment; a window normally above said compass and forming a normally upper side wall for said enclosed compartment; control means of said amplifier extending through one wall of said enclosed compartment into said openable compartment; audio means in said openable compartment and coupled to said amplifier in said enclosed compartment, said last mentioned means having a flexible conductor extending in sealed relationship through said wall between said enclosed compartment and said openable compartment; a pointer means on the normally upper surface of said enclosed housing compartment and disposed adjacent said compass; said antenna being directional and having a null direction substantially parallel to the axis of said pointer means.

9. In a direction finder the combination of: a housing having an enclosed compartment and an openable compartment; a directional antenna in said enclosed compartment, an amplifier coupled thereto; a power supply means in said enclosed compartment; a compass in said enclosed compartment; a window normally above said compass and forming a normally upper side wall for said enclosed compartment; control means of said amplifier extending through one wall of said enclosed compartment into said openable compartment; audio means in said openable compartment and coupled to said amplifier in said enclosed compartment, said last mentioned means having a flexible conductor extending in sealed relationship through said wall between said enclosed compartment and said openable compartment; pointer means on the normally upper side of said enclosed housing portion adjacent to said compass; said directional antenna having a directional characteristic corresponding with the axis of said pointer means.

10. In a direction finder the combination of: a housing having an enclosed compartment and an openable compartment; a directional antenna in said enclosed compartment, an amplifier coupled thereto; a power supply means in said enclosed compartment; a compass in said enclosed compartment; a window normally above said compass and forming a normally upper side wall for said enclosed compartment; control means of said amplifier extending through one wall of said enclosed compartment into said openable compartment; audio means in said openable compartment and coupled to said amplifier in said enclosed compartment, said last mentioned means having a flexible conductor extending in sealed relationship through said wall between said enclosed compartment and said openable compartment; transparent structure normally above said compass when in use being substantially flush with the upper surface of said enclosed housing portion.

References Cited in the file of this patent

UNITED STATES PATENTS

| 2,508,918 | Hines | May 23, 1950 |
| 2,746,824 | Bond | May 22, 1956 |
| 2,925,597 | Maxim | Feb. 16, 1960 |

FOREIGN PATENTS

| 787,653 | Great Britain | Dec. 11, 1957 |

OTHER REFERENCES

Radio and TV News, June 1957, pp. 42–44. (Copy in Scientific Library.)